Patented Nov. 24, 1936

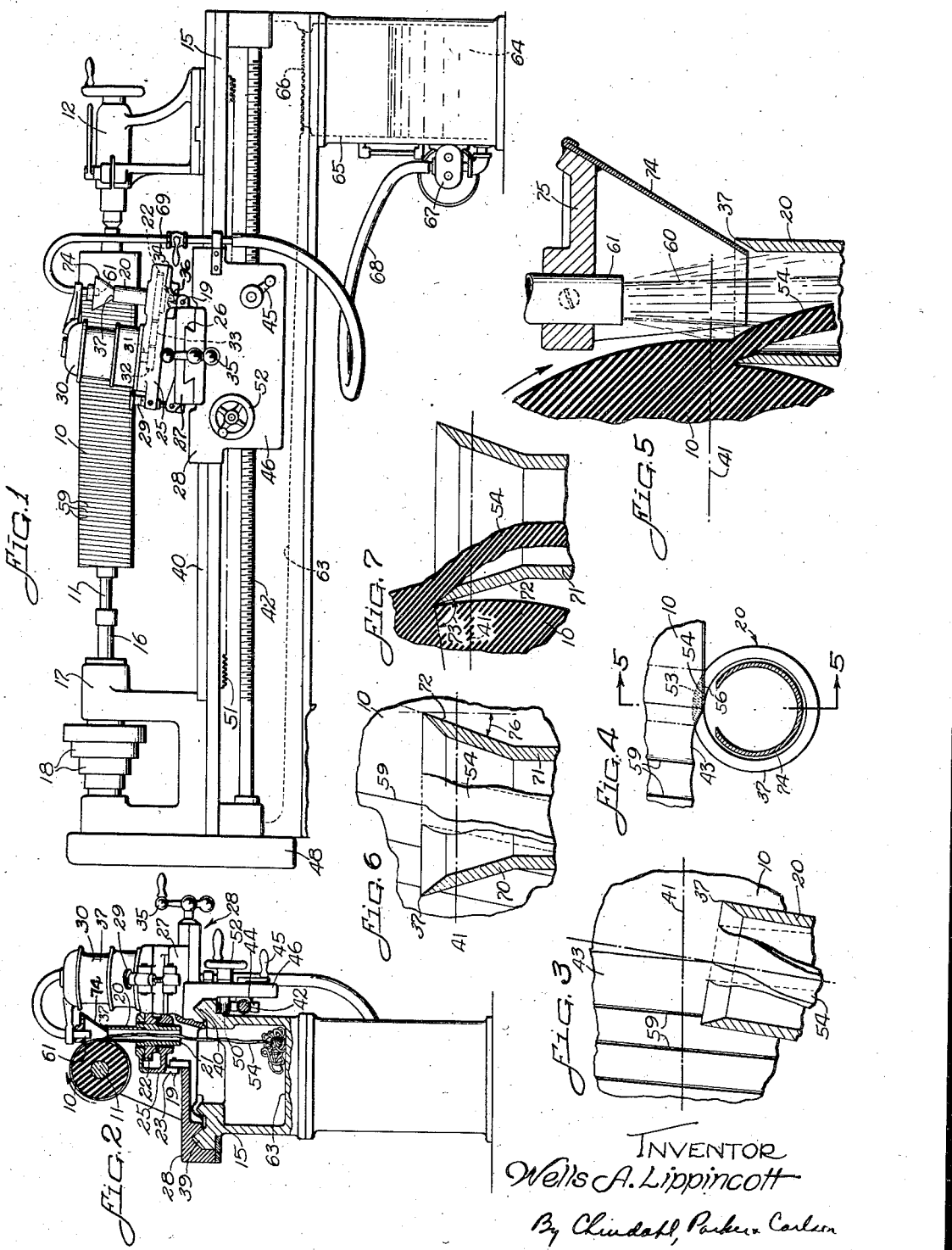

2,061,581

UNITED STATES PATENT OFFICE 2,061,581

APPARATUS FOR TRIMMING CYLINDERS

Wells A. Lippincott, Oak Park, Ill., assignor to Ideal Roller & Manufacturing Company, Chicago, Ill., a corporation of Illinois Application December 5, 1934, Serial No. 756,187

6 Claims. (Cl. 164—69)

This invention relates generally to the formation of cylindrical surfaces on rollers such as are used in printing presses, for example, and composed of rubber or like material. In particular, the invention relates to the trimming of such rollers by cutting or slicing a ribbon-like helix from the roller periphery.

The primary object of the present invention is to provide apparatus of novel character for forming the helical ribbon above referred to.

In carrying out this object, the present invention contemplates the use of a rapidly rotating tubular member having a knife edge positioned to enter the periphery of the roller in a manner such that during rotation of the roller and advancement of the cutter longitudinally thereof, a thin ribbon-like helix will be sliced from the roller leaving a surface of substantially uniform diameter which may be reduced readily to the desired smoothness.

The invention also resides in the novel manner of mounting and feeding the cutter so that a clean cut will be taken without the formation of a feather edge on the strip of material removed and thereby leaving a surface of substantially uniform diameter which may be buffed readily to the desired smoothness.

Another object of the invention is to provide a novel means for removing the ribbon-like cuttings so as to avoid clogging of the machine.

Other objects and advantages of the invention will become apparent from the following detailed description taken in connection with the accompanying drawing, in which Figure 1 is a side elevation of a machine for trimming a rubber or similar cylinder in accordance with the present invention.

Fig. 2 is an end elevation partly in section and showing details of construction of the machine.

Fig. 3 is an enlarged fragmentary view of a portion of Fig. 1 showing the cutter in section.

Fig. 4 is an enlarged fragmentary plan view of the roller and cutter in the course of trimming.

Fig. 5 is an enlarged fragmentary sectional elevation taken substantially on line 5—5 of Fig. 3.

Figs. 6 and 7 are views similar to Figs. 3 and 5 showing a modification.

While the invention is susceptible of various modifications and alternative constructions, I have shown in the drawing and will herein describe in detail a preferred embodiment, but it is to be understood that I do not hereby intend to limit the invention to the specific form disclosed, but intend to cover all modifications and alternative constructions falling within the spirit and scope of the invention as expressed in the appended claims.

In trimming a roller according to the present invention, the roller is supported adjacent a circular knife edge formed at one end of a hollow tubular member disposed substantially tangentially to the periphery of the roller and adapted to enter the latter to the desired depth. The roller is rotated at a uniform rate to present successive circumferential portions of the roller to the cutting edge, and the cutter and roller are advanced at a uniform rate relative to each other in a direction longitudinally of the roller so that successive longitudinal sections of the roller are presented to the cutter. The cutter is rotated at a relatively high speed, and liquid under pressure is directed against the severed ribbon along the line of cutting thereof whereby to lubricate the knife edge and to carry the ribbon away from the latter and through the cutter body.

In the exemplary forms of the invention shown, the roller or cylinder to be trimmed comprises a vulcanized rubber sleeve 10 of substantial thickness carried by a shaft 11. During trimming, the roller is rotated on its longitudinal axis and for this purpose is supported at one end by a conventional tail-stock 12 on a lathe bed 15. The other end is concentric with and detachably coupled to a spindle 16 of a head-stock 17, the spindle being driven by suitable power means through cone pulleys 18 fast on the spindle 16.

In the form shown in Figs. 1 to 5, the cutter comprises a hollow cylindrical tube 20 rigidly secured to one end of a hollow shaft 21 carrying a gear 22 and journaled at opposite ends in a housing 25 on which a motor 30 is mounted with its shaft 31 carrying a spur gear 32 which, through an intermediate gear 33, drives the gear 22. The tube 20 is thus rotated at high speed during operation of the motor. At its upper end, the tube 20 is formed with an internal beveled surface which cooperates with the outer periphery of the tube to define an axially facing circular knife edge 37.

For a purpose to appear later, the cutter 20 and its drive mechanism are mounted for pivotal adjustment about an axis extending transversely of the roller. To this end, the housing 25 is formed at one end with depending lugs disposed between and pivotally connected by pivot pins 19 to pairs of spaced lugs 23 rigid with a cross-slide 27 which is slidable transversely of the roller along ways 26 formed on a carriage 28. At its opposite end, the housing 25 is supported from the cross-slide through the medium of a hand screw 29 threading through an extension of the housing and connected at its end to the cross-slide. By turning the screw, the housing 25 may be swung about the pivot 19 and the inclination of the cutter body 20 relative to the roller varied as desired. This inclination may be indicated on a quadrant 34 on the housing cooperating with a pointer 36 on the cross-slide. A screw operable by a handle 35 is provided for enabling the cross-slide to be adjusted transversely of the roller so as to vary the position of the cutter 20 relative to the roller periphery.

The bed 15 has ways 39 and 40 upon which the carriage 28 is adapted to ride to carry the cutter bodily along the roller parallel to the axis thereof. A lead screw 42 is suitably journaled at opposite ends on the bed 15 and is adapted to be engaged by conventional means such as a nut 44 on the carriage 28 arranged to be moved into and out of operative engagement with the screw by turning a handle 45 mounted on a flange 46 of the carriage 28. The lead screw 42 is rotated in unison with the spindle 16 by means of suitable gearing or other driving means within a housing 48, whereby a single source of power operating through the cone pulleys 18 serves to rotate the cylinder and advance the carriage 28 in timed relation. In order to manually adjust the carriage 28 relative to the roller 10 in setting up the machine for operation, there is provided a pinion 50 engaging with a rack 51 and operable by means of a hand wheel 52. During manual adjustment of the carriage 28, the nut 44 may be disengaged from the lead screw 42 by manipulation of the handle 45.

The cutter 20 is so positioned that during rotation of the roller in the direction indicated by the arrow in Fig. 5 combined with movement of the cutter along the roller to the right as viewed in Fig. 1, the circular edge 37 will cleanly slice from the roller periphery a helical ribbon 54 having the general cross-section indicated in Fig. 4 thereby accurately trimming off the roller periphery and leaving only small ridges 59 which may be buffed off readily to reduce the roller to the desired uniform diameter. To this end, the cross-slide 23 is set for entry of the knife edge 37 to the desired depth, and the cutter 20 is disposed approximately tangentially of the roller with its edge 37 located in the direction of roller rotation a short distance beyond a horizontal plane 41 through the roller axis as shown in Figs. 3 and 5. With the cutter 20 thus positioned, that portion of the roller periphery immediately below the plane 41 will be substantially out of contact with the cylindrical side surface of the cutter, and there will be no tendency to cam the cutter outwardly. Similarly, to avoid lateral pressure on the cutter body 20, the cutter axis is inclined relative to the roller at an angle equal to or greater than the angle of the helix defined by the ridges 59. The proper inclination necessary will vary with the size of roller and with the travel of the cutter during each revolution of the roller. Preferably, the angle is sufficiently greater than the helix angle so as to enable several different sizes of rollers to be accommodated without the necessity of readjusting of the angularity of the cutter relative to the pivot 19.

From Fig. 3, it will be observed that during cutting, an arc 53 of the edge 37 is in contact with the rubber, and that during each revolution of the roller, the cutter is advanced a distance substantially less than the length of the arc 53 so that the adjacent cuts overlap each other. Thus, the ribbon 54 will have a substantially straight uncut surface 56 equal in width to the distance through which the cutter is advanced during each revolution of the roller and two intersecting slightly curved surfaces which taper toward each other. The surface 55 is formed in the preceding revolution of the roller and the surface being cut corresponds in width to the length of the arc 53 of contact between the edge 37 and the rubber. Variations in the diameter of the cutter 20 in the depth of the cut taken in the roller, and the rate of travel of the cutter will vary somewhat the dimensions of the strip 54.

Means is provided for wetting the rubber so that it may be sliced in the manner above described. This means also serves to carry away the strip 54 produced by the cutting action thereby preventing the strip from clogging the machine. For this purpose, a stream 60 of fluid, such as water, is discharged under pressure from a nozzle 61 axially spaced from the knife edge 37 and adapted to impinge against the strip 54 adjacent the point of complete formation of the strip thereby keeping the roller surface and the edge 37 wet so as to facilitate cutting of the rubber. The stream is directed downwardly through the tubular cutter body so that its force positively carries the ribbon 54 through the cutter and through the hollow shaft 21 into an inclined trough 63 below the bed 15 where the strip is collected and may be removed as desired. A guard 74 partially surrounding the nozzle 61 and supported on the latter converges toward the upper end of the cutter body and serves to direct any deflected water through the cutter.

During the cutting operation, the ribbon 54 collects in a trough 63 along the machine bed, the water draining through a screen 66 into a sump 64 within a pedestal 65 supporting the machine bed. The water is withdrawn from the sump by a motor driven pump 67 and delivered to a flexible hose 68 connected to a pipe 69 mounted on the carriage 28 and leading to the nozzle 61.

If desired, inclination of the cutter axis and location of the cutting edge below the plane 41 may be avoided through the use of a cutter having a tapering body as shown in Figs. 6 and 7. Thus, the cutting edge 37 may be formed on the larger end of a tube section 70 of frusto-conical shape. Preferably, the section 70 is rigid with the end of a tube section 71 rotatably supported and driven in the same manner as the tube 20 above described except that the rotational axis may be disposed perpendicular to the plane 41 and the edge 37 may be above this plane as shown. The degree of taper of the outer peripheral surface 72 should be such that the angle 73 (Fig. 7) between this surface and a line through the cutting edge 37 and the roller axis is equal to or greater than ninety degrees. Also the angle 76 (Fig. 6) between the periphery 72 and a transverse plane through the cylinder 10 should be equal to or greater than the helix angle above referred to.

In the operation of the machine to trim a roller to the desired diameter, the cutter is mounted as above described and the cross-slide is adjusted to set the cutting edge 37 for a cut corresponding to the diameter to which the roller is to be reduced. With the carriage shifted to position the cutter beyond the left hand end of the roller, as viewed in Fig. 1, and with the driving motors and the pump in operation, the nut 44 is engaged with the lead screw 42 to initiate the trimming operation which then occurs automatically, being complete after the cutter has moved throughout the length of the roller. The roller is then removed from the machine and may be further treated as desired.

I claim as my invention:

1. A machine for reducing the diameter of a cylinder composed of rubber or like material comprising, in combination, means for supporting a cylinder with its axis disposed in horizontal position, a support disposed at one side of the cylinder, means for rotating the cylinder in one direction and effecting relative movement between said support and the cylinder in a direction longitudinally of the latter and in timed relation to the rotation thereof, a member mounted on said support for pivotal adjustment about an axis extending transversely of and spaced from the cylinder axis, tubular cutter rotatably mounted on said member and having a circular knife edge at one end facing in a direction approximately tangentially of said cylinder, an electric motor for driving said cutter at high speed, said edge being positioned to enter the cylinder periphery at a point spaced circumferentially in the direction of rotation of the cylinder from a horizontal plane through the cylinder axis, and operating during rotation of the roller and relative movement between the roller and said support to cut a helix from the periphery of the cylinder, the axis of said cutter being positioned relative to the cylinder at an angle equal to or greater than the angle of an element of said helix.

2. A machine for reducing the diameter of a cylinder composed of rubber or like material comprising, in combination, two relatively movable supports, means on one of said supports supporting said cylinder and rotating the same on its longitudinal axis, means for effecting relative movement between said supports in a direction longitudinally of said cylinder and in timed relation to the rotation thereof, and means on the other support operable during such relative movement to cut a helix from the periphery of said cylinder comprising a power driven rotary tube section having an axially facing circular cutting edge intersecting the roller periphery and rotatable about an axis extending transversely and disposed externally of the cylinder, the periphery of said section being shaped and said edge being located so that said periphery is substantially out of contact with the cut surface of said cylinder.

3. A machine for reducing the diameter of a cylinder composed of rubber or like material comprising, in combination, two relatively movable supports, means on one of said supports supporting a cylinder and rotating the same on its longitudinal axis, means for effecting relative bodily movement between said supports in a direction longitudinally of said cylinder and in timed relation to the rotation thereof, and a power rotated member on the other of said supports having an axially facing circular knife edge intersecting the periphery of said cylinder and operating to cut a helical ribbon from the periphery of the cylinder during said bodily movement while the cylinder is rotating.

4. In a machine of the class described, the combination of means rotatably supporting a roller the diameter of which is to be reduced, a cylindrical tube rotatably supported with a segment of one end positioned to intersect the roller periphery, the internal surface of said tube being beveled at said end to form an axially projecting circular knife edge, and means for rotating said tube at high speed during relative bodily movement between the tube and roller in a direction longitudinally of the latter.

5. A machine for reducing the diameter of a cylinder composed of rubber or like material comprising, in combination, a power driven tubular knife having a circular cutting edge at one end adapted during trimming of the cylinder to enter the periphery of the latter to a depth corresponding to the diameter to which the cylinder is to be reduced, said edge engaging the rubber between two points spaced longitudinally of the cylinder and respectively disposed on the trimmed and untrimmed diameters thereof, means for rotating said cylinder at a uniform rate in a direction to present successive circumferential portions of the cylinder toward said knife, and means for feeding said knife at a uniform rate longitudinally of said cylinder.

6. In apparatus of the class described, means for rotatably supporting a roller to be trimmed, a rotary tubular member having a circular knife edge arranged to enter the periphery of the roller and slice a ribbon therefrom, and means for delivering a jet of liquid toward the point of contact between said knife edge and roller in a direction to carry said ribbon through said edge.

WELLS A. LIPPINCOTT.